US012245979B2

(12) United States Patent
Mayo et al.

(10) Patent No.: US 12,245,979 B2
(45) **Date of Patent: *Mar. 11, 2025**

(54) SYSTEM AND METHOD FOR REDUCING STRESS

(71) Applicant: VMAS Solutions, Inc., Scottsdale, AZ (US)

(72) Inventors: Vicki Mayo, Scottsdale, AZ (US); Amy Serin, Scottsdale, AZ (US); Jack Vice, Orlando, FL (US)

(73) Assignee: VMAS SOLUTIONS, INC., Scottsdale, AZ (US)

( * ) Notice: Subject to any disclaimer, the term of this patent is extended or adjusted under 35 U.S.C. 154(b) by 239 days.

This patent is subject to a terminal disclaimer.

(21) Appl. No.: 17/236,992

(22) Filed: Apr. 21, 2021

(65) Prior Publication Data

US 2021/0236370 A1 Aug. 5, 2021

Related U.S. Application Data

(63) Continuation of application No. 15/976,123, filed on May 10, 2018, now Pat. No. 11,000,437, which is a (Continued)

(51) Int. Cl.

| | |
|---|---|
| ***A61H 23/00*** | (2006.01) |
| ***A61H 1/00*** | (2006.01) |
| *A61H 23/02* | (2006.01) |

(52) U.S. Cl.

CPC ........... *A61H 1/00* (2013.01); *A61H 23/0245* (2013.01); *A61H 2201/1635* (2013.01); (Continued)

(58) Field of Classification Search

CPC .... A61H 23/00; A61H 23/02; A61H 23/0263; A61H 2023/0272; A61B 5/02; A61B 5/024; A61B 5/0205

See application file for complete search history.

(56) References Cited

U.S. PATENT DOCUMENTS

| | | |
|---|---|---|
| 3,064,642 A | 11/1962 | Stewart |
| 4,098,266 A | 7/1978 | Muchisky |

(Continued)

FOREIGN PATENT DOCUMENTS

| | | | |
|---|---|---|---|
| KR | 20140059035 | | 5/2014 |
| WO | WO2015013293 | A1 | 1/2015 |

(Continued)

OTHER PUBLICATIONS

European Patent Office International Searching Authority, International Search Report and Written Opinion in International Application No. PCT/US2017/027046 mailed Jul. 12, 2017.

(Continued)

*Primary Examiner* — Colin W Stuart
*Assistant Examiner* — Christopher E Miller
(74) *Attorney, Agent, or Firm* — Transformative Legal LLC; Len S. Smith; Julie E. Kurzrok

(57) ABSTRACT

A method for providing a therapeutic benefit includes receiving sensor data from one or more physiological sensors associated with a person and determining whether the sensor data exceeds a threshold. When the sensor data exceeds the threshold, a controller activates a first tactile stimulator to provide a first stimulation for a first period when the sensor data exceeds the threshold and then activates a second tactile stimulator to apply a second stimulation for a second period beginning at least commensurate with a cessation of (at the same time or overlapping) the first period. The bi-lateral stimulation is repeated for a therapeutically effective number of repetitions such that the first and second stimulations are applied bi-laterally to the body of the person without the individual perceiving a pause in stimulation between the first stimulation and second stimulation to provide the therapeutic benefit to the person.

12 Claims, 16 Drawing Sheets

Related U.S. Application Data continuation-in-part of application No. 15/345,916, filed on Nov. 8, 2016, now abandoned.

(60) Provisional application No. 62/324,023, filed on Apr. 18, 2016.

(52) U.S. Cl.
CPC .................. *A61H 2201/165* (2013.01); *A61H 2201/5007* (2013.01); *A61H 2201/5046* (2013.01); *A61H 2201/5064* (2013.01); *A61H 2201/5082* (2013.01); *A61H 2201/5084* (2013.01); *A61H 2201/5097* (2013.01); *A61H 2230/065* (2013.01); *A61H 2230/085* (2013.01); *A61H 2230/201* (2013.01); *A61H 2230/305* (2013.01); *A61H 2230/505* (2013.01)

(56) References Cited

U.S. PATENT DOCUMENTS 4,105,024 A 8/1978 Raffel
4,232,661 A 11/1980 Christensen
4,343,303 A 8/1982 Williams
4,371,815 A 2/1983 Jones, Jr.
5,099,829 A 3/1992 Wu
5,437,607 A 8/1995 Taylor
5,437,608 A 8/1995 Culter
5,486,156 A 1/1996 Takach
5,519,292 A 5/1996 Taylor
5,545,125 A 8/1996 Tseng
5,575,761 A * 11/1996 Hajianpour ........ A61H 23/0263 601/48
5,611,771 A 3/1997 Taylor
5,836,899 A 11/1998 Reilly
6,001,073 A 12/1999 Schmidt
6,039,702 A 3/2000 Culter
6,077,238 A 6/2000 Chung
6,217,533 B1 4/2001 McCambridge
6,290,661 B1 9/2001 Cutler
6,375,630 B1 4/2002 Culter
6,409,655 B1 6/2002 Wilson
6,422,992 B1 7/2002 Raffel
6,685,660 B1 2/2004 Taverna
7,152,345 B2 12/2006 Koenig
7,153,283 B1 12/2006 Triolo
7,330,752 B2 * 2/2008 Kettunen ............. A61B 5/4884 600/509
7,614,168 B1 11/2009 Zummer
7,832,124 B2 11/2010 Blockton
8,142,373 B1 3/2012 Riles
8,322,055 B1 12/2012 Saint-Cyr
8,644,967 B2 2/2014 Seiler
10,098,810 B1 10/2018 Muench
10,172,762 B1 * 1/2019 Branch .................. A61H 23/02
10,512,750 B1 12/2019 Lewin
2002/0035995 A1 3/2002 Schmidt
2004/0030273 A1 2/2004 Tucker
2004/0133133 A1 7/2004 Dreimann
2004/0260211 A1 12/2004 Maalouf
2005/0113723 A1 5/2005 Jeyama
2005/0113724 A1 5/2005 Wriggle
2005/0267388 A1 12/2005 Hanna
2007/0255187 A1 11/2007 Branch
2008/0027363 A1 * 1/2008 Brueckmann ...... A61H 23/0263 601/46
2008/0188706 A1 8/2008 Gonet
2009/0005713 A1 1/2009 Podrazhansky
2009/0076421 A1 3/2009 Grant, Jr.
2009/0171418 A1 7/2009 Sarif
2009/0187124 A1 7/2009 Ludlow
2010/0204595 A1 * 8/2010 Marx ..................... A61B 5/486 600/509
2011/0190594 A1 8/2011 Heit
2011/0232134 A1 9/2011 Radl
2011/0251495 A1 * 10/2011 Province .................. A61B 5/01 600/587
2011/0271554 A1 11/2011 Jazdanian
2011/0290252 A1 12/2011 Amjad
2012/0022415 A1 1/2012 Mullen
2012/0023785 A1 2/2012 Barnes
2012/0046579 A1 2/2012 Radl
2012/0157895 A1 6/2012 Barlow
2012/0186101 A1 7/2012 Sanchez
2012/0197337 A1 8/2012 Su
2012/0253236 A1 10/2012 Snow
2012/0289788 A1 * 11/2012 Jain ........................ A61B 5/165 702/19
2012/0302929 A1 * 11/2012 Tkachenko ........ A61H 23/0254 601/48
2013/0041296 A1 * 2/2013 Tass ................... A61H 23/0245 601/46
2013/0204169 A1 8/2013 Poepperling
2013/0296745 A1 11/2013 Cheatam
2013/0303953 A1 11/2013 Lattner
2013/0345606 A1 12/2013 Ehrenreich
2014/0107542 A1 4/2014 Schubert
2014/0142477 A1 5/2014 Park
2014/0142478 A1 5/2014 Malaviya
2014/0179986 A1 6/2014 Kelley
2014/0188276 A1 * 7/2014 Roseway ............... A61B 5/165 700/258
2014/0329214 A1 * 11/2014 Bitoun ................... G16H 20/70 434/262
2014/0350442 A1 11/2014 Park
2015/0022328 A1 1/2015 Choudhury
2015/0032808 A1 1/2015 Han
2015/0038886 A1 * 2/2015 Snow ..................... A61H 23/02 601/46
2015/0119766 A1 4/2015 Driscoll
2015/0119770 A1 * 4/2015 Driscoll ................. A61H 23/00 601/48
2015/0182418 A1 7/2015 Zaiss
2015/0224019 A1 * 8/2015 Barbera ................. A61H 23/02 601/46
2015/0290074 A1 10/2015 Koenig
2015/0305971 A1 10/2015 Davis
2015/0305974 A1 10/2015 Ehrenreich
2015/0328081 A1 11/2015 Goldenberg
2015/0328082 A1 11/2015 Jiang
2016/0000640 A1 1/2016 Lai
2016/0000643 A1 1/2016 Makower
2016/0001034 A1 1/2016 Rembrand
2016/0022533 A1 1/2016 Makower
2016/0030279 A1 2/2016 Driscoll
2016/0034650 A1 2/2016 DeLoach
2016/0058658 A1 3/2016 Borras
2016/0074276 A1 3/2016 Scheuring
2016/0095782 A1 4/2016 Shockley, Jr.
2016/0158097 A1 6/2016 Harper
2016/0199249 A1 * 7/2016 Dunham ................ A61H 21/00 601/15
2016/0242995 A1 8/2016 Shafieloo
2016/0324462 A1 * 11/2016 Hämäläinen ....... A61B 5/02055
2016/0346501 A1 * 12/2016 Hooper ................ A61B 5/4836
2017/0119619 A1 5/2017 Dills
2017/0135896 A1 * 5/2017 Snow ................. A61H 23/0218
2017/0215745 A1 * 8/2017 Felix .................... A61B 5/7225
2017/0274173 A1 9/2017 Ryotokuji
2017/0296429 A1 10/2017 Mayo
2017/0296775 A1 10/2017 Mayo
2017/0326024 A1 11/2017 Hernandez
2017/0326025 A1 11/2017 Hernandez
2017/0340270 A1 11/2017 Ganesh
2017/0348184 A1 12/2017 Pisharodi
2018/0153763 A1 * 6/2018 Tseng ..................... A61H 11/00
2018/0256432 A1 9/2018 Mayo
2018/0303704 A1 10/2018 Idris
2018/0315504 A1 11/2018 Inada
2018/0318545 A1 11/2018 Jones
2019/0029907 A1 1/2019 Lee

(56) References Cited

U.S. PATENT DOCUMENTS

| | | | |
|---|---|---|---|
| 2019/0070057 | A1 | 3/2019 | Conner |
| 2019/0307983 | A1 | 10/2019 | Goldman |
| 2020/0281525 | A1 | 9/2020 | Mills |

FOREIGN PATENT DOCUMENTS

| | | | |
|---|---|---|---|
| WO | WO2017184384 | | 10/2017 |
| WO | WO2020101718 | A1 | 5/2020 |

OTHER PUBLICATIONS

Final Office Action on Mar. 25, 2022 for U.S. Appl. No. 17/306,911, Miller, Christopher E.

Alexa Fry, "Stress and Insomnia" (Jun. 24, 2021), Sleep Foundation. https://www.sleepfoundation.org/insomnia/stress-and-insomnia (Year: 2021), Fry, Alexa.

Servan Schreiber, et al., ""Eye Movement Desensitization and Reproccessing for Posttraumatic Stress Disorder: A Pilot Blinded, Randomized Study of Stimulation Type,"" Psychotherapy and Psychosomatics, 2006; 75:290-297, DOI: 10.1159/000093950, Aug. 10, 2006, Servan-Schreiber, David.

Non-Final Office Action on Apr. 23, 2020 for U.S. Appl. No. 15/438,021, Miller, Christopher E.

Final Office Action on Sep. 19, 2019 for U.S. Appl. No. 15/438,021, Miller, Christopher E.

Non-Final Office Action on May 2, 2019 for U.S. Appl. No. 15/438,021, Miller, Christopher E.

EP Summons for EP Application 17720917.8 issued Oct. 23, 2020, European Summons, Search Report.

Non-Final Office Action on Feb. 21, 2020 for U.S. Appl. No. 15/976,123, Miller, Christopher E.

Non-Final Office Action on Jun. 7, 2023 for U.S. Appl. No. 17/822,422, Miller, Christopher E.

Non-Final Office Action on Dec. 7, 2021 for U.S. Appl. No. 17/306,911, Miller, Christopher E.

Non-Final Office Action on Aug. 4, 2021 for U.S. Appl. No. 17/306,920, Miller, Christopher E.

Final Office Action on Jul. 18, 2022 for U.S. Appl. No. 17/306,920, Miller, Christopher E.

Non-Final Office Action on Mar. 25, 2022 for U.S. Appl. No. 17/306,920, Miller, Christopher E.

Final Office Action on Nov. 24, 2021 for U.S. Appl. No. 17/306,920, Miller, Christopher E.

Non-Final Office Action on Aug. 3, 2021 on U.S. Appl. No. 17/306,911, Miller, Christopher E.

Final Office Action on Aug. 20, 2020 for U.S. Appl. No. 15/976,123, Miller, Christopher E.

Australian Examination Report on Apr. 4, 2023 for 2022201882.

Non-Final Office Action on Jun. 10, 2020 for U.S. Appl. No. 16/191,242, Cox, Thaddeus B.

Final Office Action on Nov. 19, 2020 for U.S. Appl. No. 16/191,242, Cox, Thaddeus B.

European Search Report on Aug. 9, 2022 for 221662075.

Final Office Action on Nov. 13, 2023 for U.S. Appl. No. 17/822,422, Miller, Christopher E.

* cited by examiner

808

| Parameter | Threshold Value | Mitigation Value | Initial Therapy | Modified Therapy |
|---|---|---|---|---|
| P1 | T1 | M1 | Th1 | MTh1 |
| P2 | T2 | M2 | Th2 | MTh2 |
| • | • | • | • | • |
| • | • | • | • | • |
| • | • | • | • | • |
| PN | TN | MN | ThN | MThN |

900 902 904 906 908

FIG. 9

SYSTEM AND METHOD FOR REDUCING STRESS

RELATED APPLICATIONS

This application is a continuation of presently co-pending U.S. patent application Ser. No. 15/976,123 filed May 10, 2018, entitled System and Method for Reducing Stress (an issue fee has been paid in this application), which is a continuation-in-part of and claims the benefit of U.S. patent application Ser. No. 15/345,916, filed Nov. 8, 2016, and which both claimed the benefit of U.S. Provisional Application No. 62/324,023 filed Apr. 18, 2016, entitled System and Method for Reducing Stress. The entirety of all of the referenced priority applications is hereby incorporated by reference.

TECHNICAL FIELD

The technical field generally relates to stress reduction, and more particularly relates to a system and method for reducing stress to improve performance.

BACKGROUND

Stress is one of the most pervasive psychological complaints. Stress has been linked to digestive distress, headaches, depression, sleep problems, weight gain, underachievement, panic, avoidance, and poor physical health. When sensory information or thoughts are integrated in the brain and trigger the sympathetic nervous system, performance worsens. Returning an individual to a calm state as soon as possible is desirable. Once acute stress is experienced over time, the brain develops neural "habits" that overemphasize the stress response. Stress is known to increase body inflammation and is considered to be the root cause of significant suffering, often impeding performance and the ability to carry out normal daily activities to one's potential.

In many adults, chronic stress begins in childhood from genetic predispositions, and/or traumatic physical or emotional distress. Stress adversely impacts brain development and creates over activation of the sympathetic nervous system, resulting in performance degradation, preoccupation, depression, anxiety, over-reactivity, and sub-optimal functioning in other areas of the brain. The brain's structure and function can be significantly altered in ways that promote ongoing stress and less adaptability. The more stress experienced in childhood has been shown to correlate with a number of negative outcomes related not only to psychological problems, but also physical disease and mortality.

Accordingly, it is desirable to provide methods and systems for disrupting the brain's habit of over-activating the sympathetic nervous system. It is further desirable that the systems and methods are easy to use and do not impede individual's mobility or performance of their job or other everyday tasks. It is still further desirable that the systems and methods can be used intermittently (manually) as desired or automatically upon detection or anticipation of a stressful state of a person. Other desirable features and characteristics will become apparent from the subsequent summary and detailed description and the appended claims, taken in conjunction with the accompanying drawings and the foregoing technical field and background.

BRIEF SUMMARY

Various non-limiting embodiments of an alternating bilateral stimulation system and method for providing a therapeutic benefit to a person are disclosed herein.

In a first non-limiting embodiment, a method for providing a therapeutic benefit to a person, includes, but is not limited to receiving sensor data from one or more physiological sensors and environmental sensors associated with the person and determining whether the sensor data exceeds a threshold. When the sensor data exceeds the threshold, a controller activates a first tactile stimulator to provide a first stimulation for a first time period when the sensor data exceeds the threshold and then activates a second tactile stimulator to apply a second stimulation for a second time period beginning at least commensurate with a cessation of (at the same time or overlapping) the first time period. The bi-lateral stimulation is repeated for a therapeutically effective number of repetitions such that the first and second stimulations are applied bi-laterally to the body of the person without the person experiencing a perceivable pause in stimulation between the first stimulation and second stimulation to provide the therapeutic benefit to the person.

In another non-limiting embodiment, a system for providing a therapeutic benefit to a person includes, but is not limited to, first and second tactile stimulators bi-laterally positioned in therapeutic contact with a body of an individual. A plurality of physiological sensors and a plurality of environmental sensors are coupled to the first and second tactile stimulators. A controller is coupled to the first and second tactile simulators, the plurality of physiological and the a plurality of environmental sensors and operates to cause the first tactile stimulator to apply a first stimulation for a first time period and causing the second tactile stimulator to apply a second stimulation for a second time period beginning at least commensurate with a cessation of (at the same time or overlapping) the first time period such that the first and second stimulations applied bi-laterally to the body of the person without a perceivable pause in stimulation between the first stimulation and second stimulation provide the therapeutic benefit to the person.

DESCRIPTION OF THE DRAWINGS

Embodiments of the present invention will hereinafter be described in conjunction with the following drawing figures, where like numerals denote like elements.

FIG. 9 is an illustration of a memory table for sensor and operational parameters for the bi-lateral stimulation system of FIG. 8 in accordance with non-limiting embodiments.

DETAILED DESCRIPTION

As used herein, the word "exemplary" means "serving as an example, instance, or illustration." The following detailed description is merely exemplary in nature and is not intended to limit application and uses. Any embodiment described herein as "exemplary" is not necessarily to be construed as preferred or advantageous over other embodiments. All of the embodiments described in this Detailed Description are exemplary embodiments provided to enable persons skilled in the art to make or use the embodiment and not to limit the scope that is defined by the claims. Furthermore, there is no intention to be bound by any expressed or implied theory presented in the preceding Technical Field, Background, Drawings Summary or the following Detailed Description.

Figure 1:
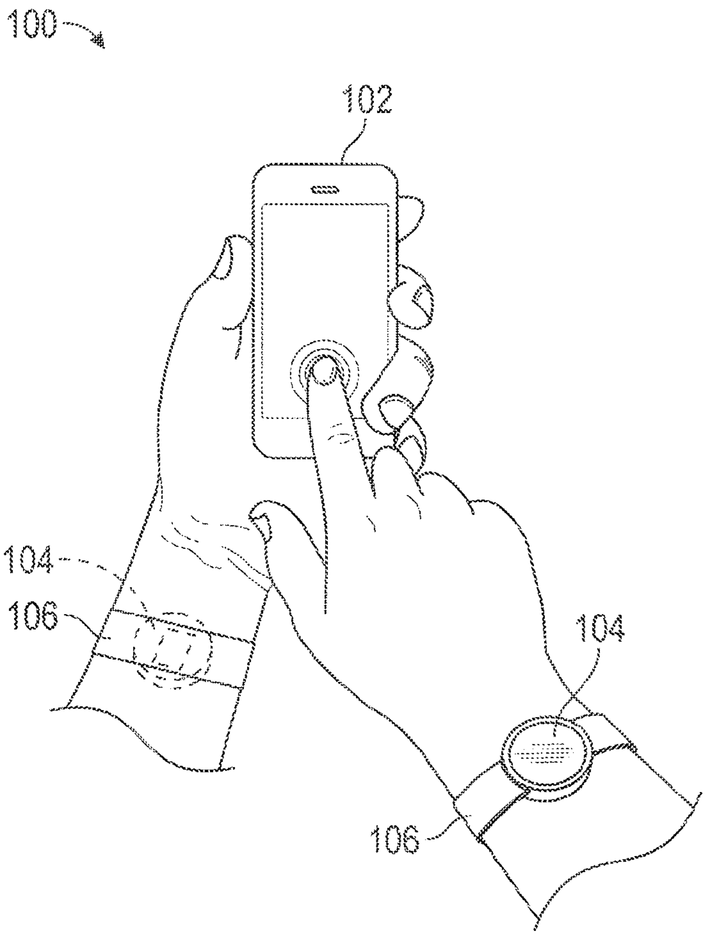
FIG. 1 is an illustration of a bi-lateral stimulation system in accordance with a non-limiting embodiment.

FIG. 1 is an illustration of a bi-lateral stimulation system 100 in accordance with a non-limiting embodiment. The stimulation system 100 is said to be bi-lateral, as stimulation is applied to opposing sides of individual's body. In the embodiment illustrated in FIG. 1, vibrating elements 104 are coupled to the individual's wrists by a band 106. The vibrating elements 104 are controlled by a mobile device 102 (e.g., cell phone, tablet computer, personal digital assistant or remote-control device) running a software application (or app) that wirelessly communicates with the vibrating elements 104 via the mobile device 102 causing them to vibrate. In a manual mode of operation, an individual may activate bi-lateral stimulation by operating the mobile device 102, including manually programming various stimulation parameters for the bi-lateral stimulation. The mobile device 102, in turn, operates the vibrating elements 104 to provide the bi-lateral stimulation to the person wearing the vibrating elements 104. In an automatic mode of operation, the application program running in the mobile device 102 monitors physiological and environmental parameters to determine whether an individual is experiencing (or about to experience) an increase in stress, and then automatically activate bi-lateral stimulation. In some embodiments, the bi-lateral stimulation that is automatically applied is selected responsive to which of one or more of the physiological parameters exceed a threshold indicative that the individual is experiencing (or about to experience) an increase in stress. The bi-lateral stimulation can be applied for a predetermined period of time or until one or more physiological parameters fall below a mitigation threshold. As used here, "mitigation" means that the stress experienced (or the parameters indicating that stress is about to be experienced) by an individual has been sufficiently reduced to indicate some recovery from physiological stress. In this way, the automatic mode of operation is said to be "closed-loop" meaning that bi-lateral stimulation can be applied and stopped automatically via the monitoring and evaluation-of-physiological-and-environmental-parameters.

In one exemplary embodiment, bi-lateral asynchronous stimulation is provided by the vibrating elements 104. As used herein, "asynchronous" means to stimulate each vibrating element 104 in an alternating manner with some period of overlap where both stimulating elements are vibrating simultaneously. The overlap area may begin randomly or may be programmed as will be discussed below. The vibrating elements 104 alter the brain's internal communication in multiple areas including the somatosensory cortex and other brain networks. This interferes with the brain's ability to activate the sympathetic nervous system and therefore reduces the stress response. By applying the bi-lateral and asynchronous stimulation to the individual's body, the individual experiences a reduction in stress and a lessening of distressing body sensations (e.g., racing heartbeat, stomach aches). Because the brain can activate sympathetic arousal in milliseconds, the overlap period provides an advantage over conventional bi-lateral stimulators because a stimulation gap commonly used in conventional bi-lateral stimulators could allow for the brain to activate the sympathetic system. The stimulation provided during the overlap period also enhances bi-lateral impact in the somatosensory areas of the individual's brain.

In another exemplary embodiment, continuous bi-lateral stimulation is provided by the vibrating elements 104. As used herein, "continuous" means to stimulate each vibrating element 104 in an alternating manner without any gap or pause between the stimulation being applied to opposing (bi-lateral) sides of the body. Similar to asynchronous stimulation, continuous bi-lateral stimulation alters the brain's internal communication in multiple areas including the somatosensory cortex and other brain networks continuously so as not to provide time for the brain to activate the sympathetic system.

Figure 2:
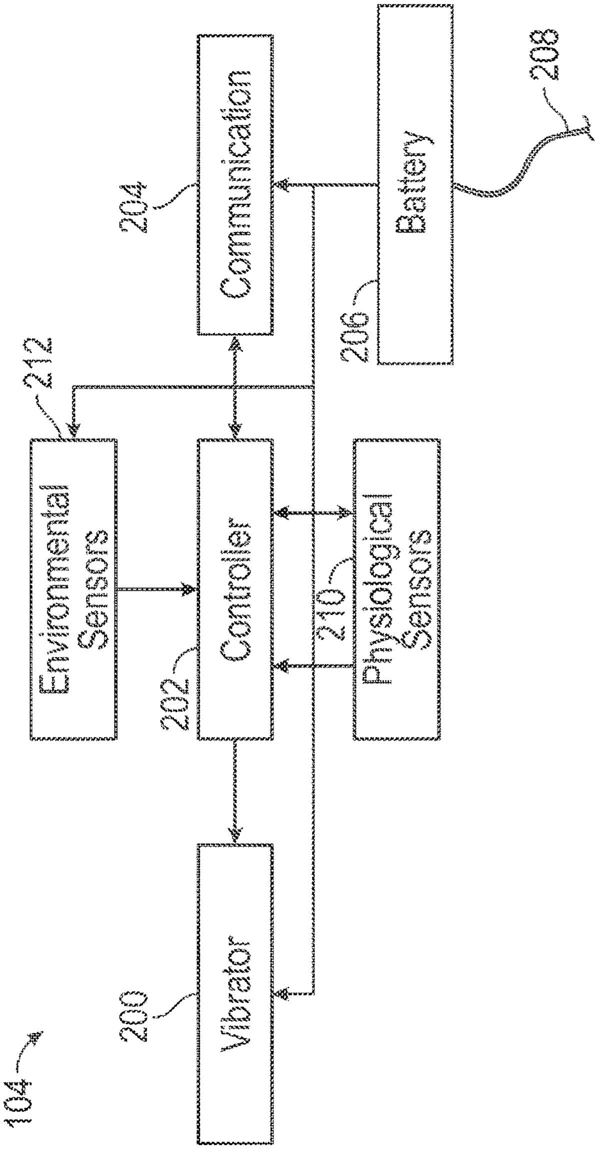
FIG. 2 is a block diagram of the stimulation elements of FIG. 1 in accordance with a non-limiting embodiment.

Referring now to FIG. 2, a block diagram of a vibrating element 104 is shown. The vibrating element 104 includes a vibrator 200, which in some embodiments is a piezoelectric vibrator as is known in the art. The vibrator 200 is controlled by a controller 202 which receives instructions via the communication module 204 from the mobile device 102 (see FIG. 1). A battery 206 provides power to each of the components of vibrating element 104. The battery 206 may utilize any suitable battery chemistry, including, but not limited to, alkali, metal-hydride, lithium and may be rechargeable or replaceable depending upon the implementation in any given embodiment. In some embodiments, the battery 206 may be coupled via cable 208 to power or recharge the battery 206 from a supplemental power source (not shown in FIG. 2) such as the mobile device 102 (see, FIG. 1). The cable 208 may be fitted with a micro USB connector or other suitable connector as will be appreciated by those skilled in the art. The communication module 204 may be any form of low-power wireless communication (e.g., BLUETOOTH, WIFI). In some embodiments, controller 202 comprises one or more processors. The processor(s) may reside in single integrated circuit, such as a single or multi-core microprocessor, or any number of integrated circuit devices and/or circuit boards working in cooperation to accomplish the functions of the controller 202. The processor(s) may be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The controller 202 may also contain a memory system, such as non-volatile memory (e.g., Read Only Memory (ROM), flash memory, etc.), volatile memory (e.g., Dynamic Random Access Memory (DRAM)), or some combination of the two.

In accordance with exemplary embodiments, the controller 202 is also coupled to one or more physiological sensors 210 and environmental sensors 212. The physiological sensors 210 measure one or more (or a plurality) of physiological parameters of the individual employing the vibrating elements 104 to receive bi-lateral stimulation as will be discussed further in connection with FIG. 3. The environmental sensors 212 measure one or more (or a plurality) of environmental parameters surrounding and potentially impacting the individual using the vibrating elements 104 for bi-lateral stimulation as will be discussed further in connection with FIG. 4. The parameters measured by the physiological sensors 210 and the environmental sensors 212 are transmitted to the mobile device 102 via the communication module 204. The mobile device 102 processes and analyzes the parameters and may determine to apply bi-lateral stimulation by comparing the receive parameters to one or more thresholds stored in memory in the mobile device 102. By measuring and analyzing the physiological parameters and the environmental parameters the mobile device 102 is capable of automatically initiating bi-lateral stimulation to reduce or alleviate stress (or the potential onslaught of stress) in the individual.

Figure 3:
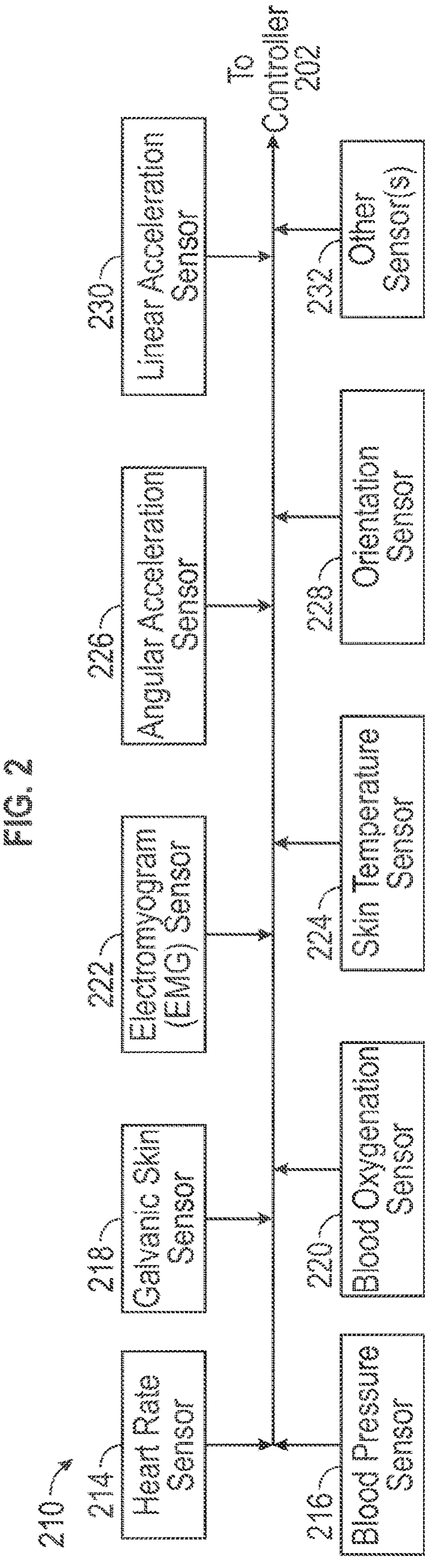
FIG. 3 is a block diagram of the physiological sensors of FIG. 2 in accordance with a non-limiting embodiment.

With continued reference to FIGS. 1-2. FIG. 3 is a block diagram of non-limiting examples of the physiological sensors 210. The physiological sensors 210 may include a heart rate sensor 214, a blood pressure sensor 216, a galvanic skin sensor 218, a blood oxygenation sensor 220, an electromyogram (EMG) sensor 222, a skin temperature sensor 224, an angular acceleration sensor 226 for the vibrating element 104, and orientation sensor 228 for the vibrating element 104, a linear acceleration sensor 230 for the vibrating element 104, and any other sensors 232 as desired for any particular implementation of the physiological sensors 210. The use of the parameters measured by the physiological sensors 210 by the bi-lateral stimulation system 100 will be discussed further in connection with FIGS. 8-9 and FIGS. 18A-C.

Figure 4:
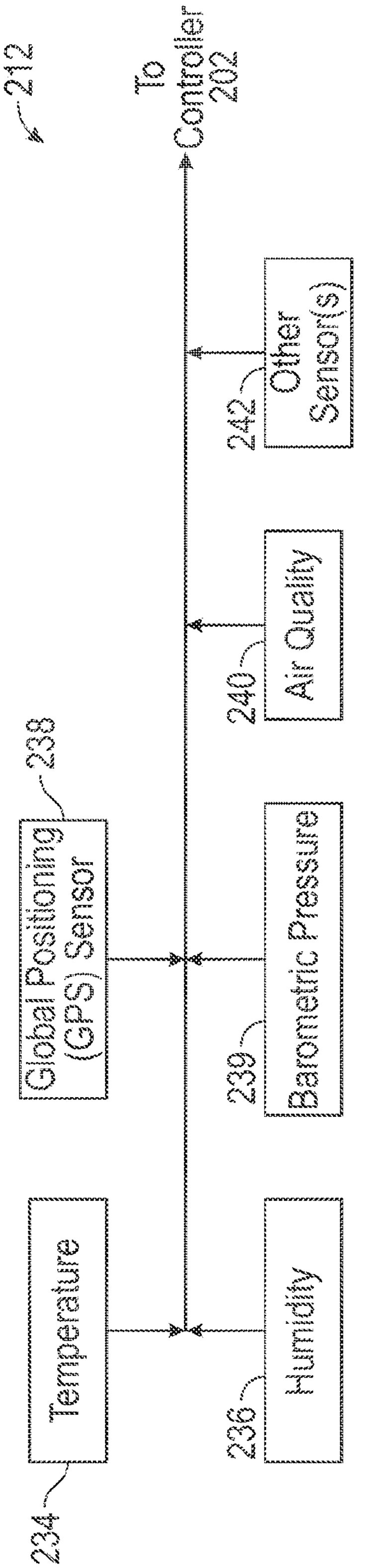
FIG. 4 is a block diagram of the environmental sensors of FIG. 2 in accordance with a non-limiting embodiment.

With continued reference to FIGS. 1-2. FIG. 4 is a block diagram of non-limiting examples of the environmental sensors 212. The environmental sensors 212 may include a temperature sensor 234, a humidity sensor 236, a global positioning sensor (GPS) 238, a barometric pressure sensor 239, an air quality sensor 240 and any other sensors 242 as may be desired any particular implementation. The use of the parameters measured by the environmental sensors 212 by the bi-lateral stimulation system 100 will be discussed further in connection with FIGS. 8-9 and FIGS. 18A-C.

Figure 5A:
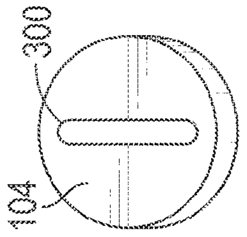
FIGS. 5A-5B are illustrations of non-limiting embodiments of the stimulation elements of FIG. 2.
Figure 5B:
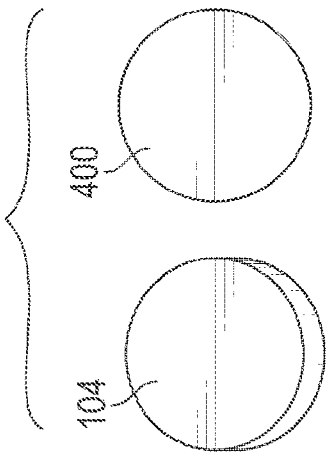

FIGS. 5A and 5B are illustrations of two non-limiting embodiments of the vibrating element 104. In FIG. 5A, the vibrating element 104 is a fixed with a clip 300 that an individual can attach to a band around a portion of individual's body (e.g., wrist, arm, chest, leg) to position the vibrating element 104 on an individual. In the embodiment illustrated in FIG. 5B, the vibrating element 104 may be temporarily positioned and fixed to an individual's body by a removable adhesive disc 400. As used herein, a vibrating element 104 being brought into position or placed on individual body means being brought into therapeutic contact with an individual's body. Therapeutic contact may be achieved by direct contact (e.g., hand-held, secured via adhesive or placed via a strap) or via indirect contact (e.g., through clothing, a coupling gel or through a wearable device). Accordingly, therapeutic contact means only that the individual need be able to perceive the stimulation provided by the bi-lateral vibrating elements 104 during therapy.

Figure 6A:
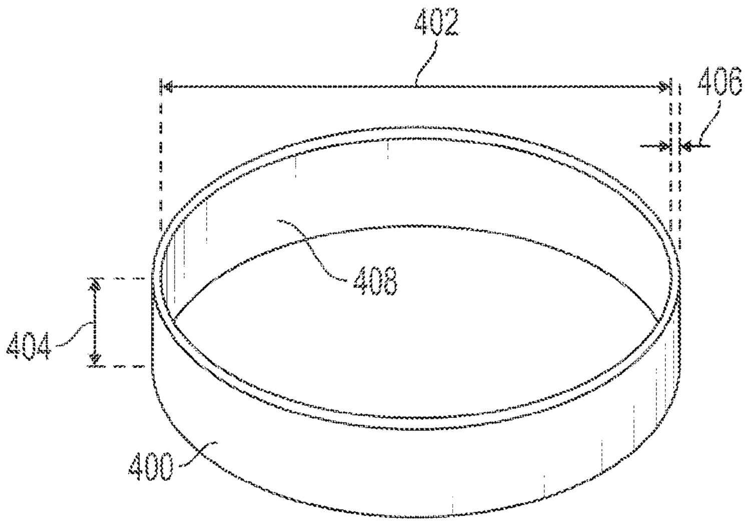
FIGS. 6A-6B are illustrations of securing bands that can be used with the stimulation elements of FIGS. 5A-5B in accordance with a non-limiting embodiment.
Figure 6B:
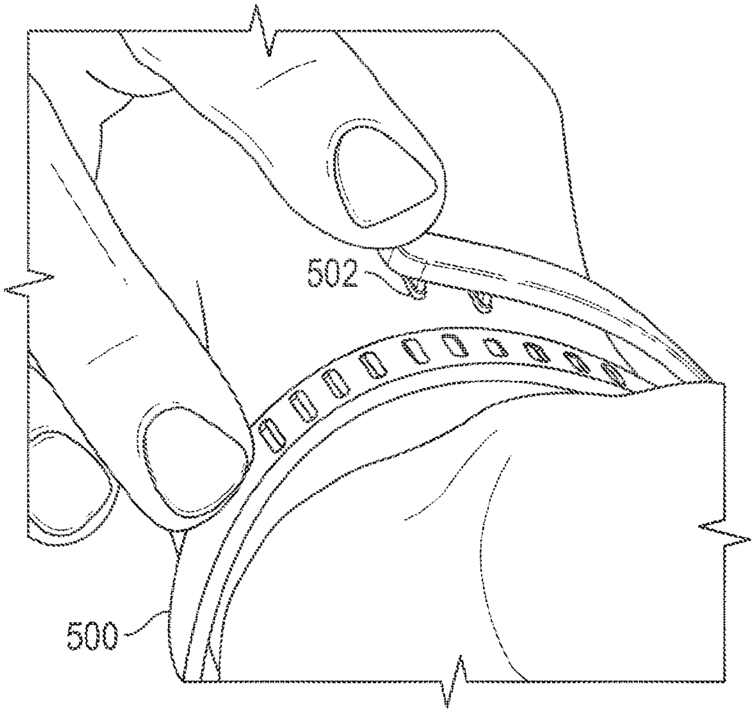

With continued reference to FIGS. 1-5, FIGS. 6A-B illustrate other non-limiting techniques for positioning a vibrating element 104 on an area of an individual's body. In FIG. 6A, a securing band 400 is shown. The securing band 400 may be compliant, elastic or may be secured using a hook-and-eye arrangement as is known in the art. The securing band 400 has a diameter 402, a height 404 and a thickness 406 sized suitably for the area of the individual's body (e.g., wrist, arm, chest, leg, ankle) that the band 400 will be placed around. The thickness 406 is also selected to facilitate attachment of the vibrating element 104 by the clip 300 (see FIG. 5A). The securing band 400 has an interior surface 408 upon which a material can be placed for the individual's comfort or to absorb moisture. In FIG. 6B, a wristband 500 is illustrated that may be used to position the vibrating elements 104 about an individual's wrist. The wristband 500 has an attachment mechanism 502 for securing the vibrating element 104 to the individual's wrist. The attachment mechanism 502 may be any suitable attachment mechanism such as those used to attach a wristwatch or fitness monitor to a person's wrist. In still other embodiments a hook-and-eye attachment mechanism may be used as is known in the art.

Figure 7A:
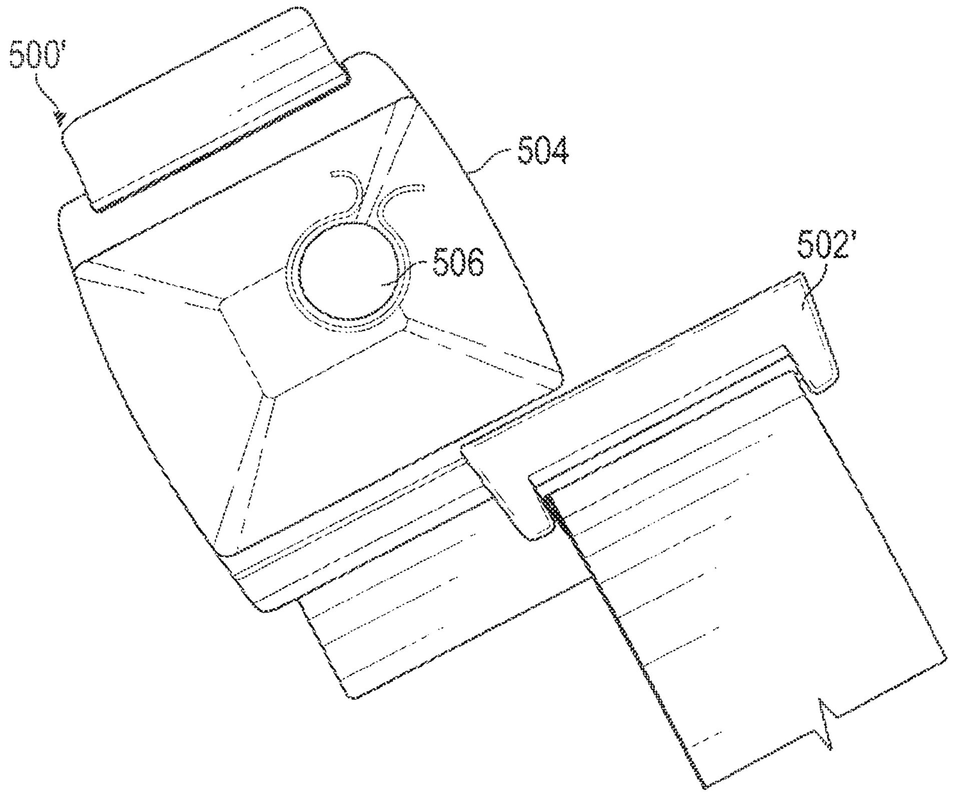
FIG. 7A are illustrations of a wristband that can be used with the stimulation element of FIG. 2 in accordance with a non-limiting embodiment.
Figure 7B:
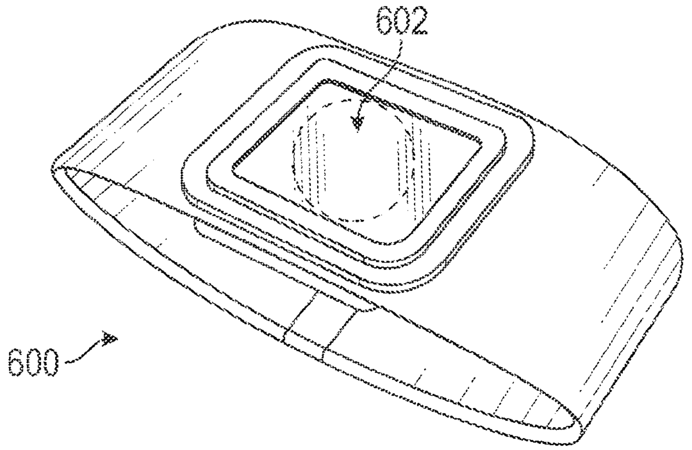
FIG. 7B is an illustration of a fitness monitor for use with the stimulation elements of FIG. 2 in accordance with a non-limiting embodiment.
Figure 7C:
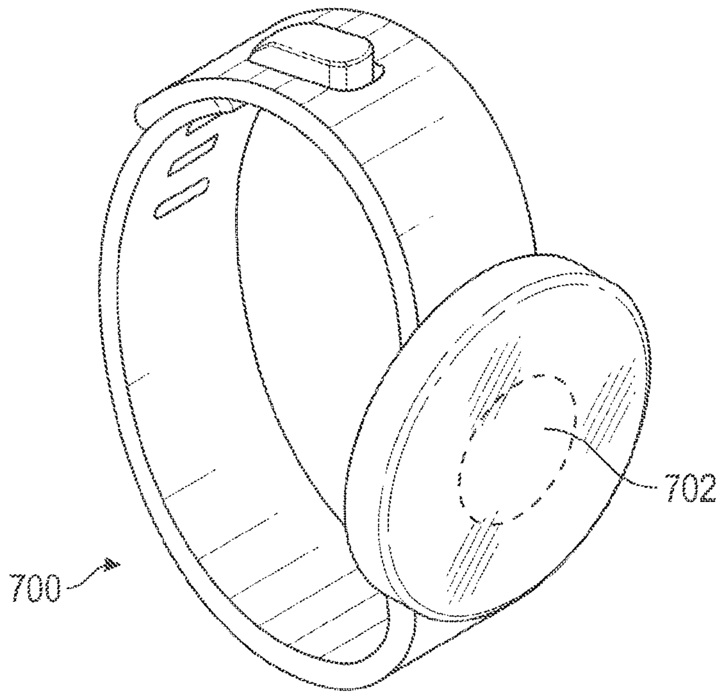
FIG. 7C is an illustration of a wristwatch for use with the stimulation elements of FIG. 2 in accordance with a non-limiting embodiment.

With continued reference to FIGS. 1-5, FIGS. 7A-C illustrate other techniques for positioning a vibrating element 104 on a person. In FIG. 7A, a wristband 500' is illustrated for positioning a housing 504 containing a vibrating element 506 about an individual's wrist. The wristband 500' has a sliding attachment mechanism 502' for securing the housing 504 (and thus the vibrating element 506) to the individual's wrist. The wristband 500 or 500' may be formed of plastic, leather, fabric, metal or other suitable material and may be designed to be worn casually or as a fashion accessory. As will be appreciated, the vibrating elements 104 may also be combined into other devices. For example, FIG. 7B illustrates a wrist-worn fitness monitor 600 that includes a recess 602 on the interior portion of the device sized suitably to receive a vibrating element 104. The vibrating element 104 may be placed in the recess 602 by a friction-fit arrangement or by use of a removable adhesive disc (see FIG. 5B). Similarly, FIG. 7C illustrates a wristwatch 700 having a recess 702 on an interior portion to receive the vibrating element 104 as described above.

With continued reference to FIGS. 1-7, FIG. 8 illustrates a more detailed block diagram of the bi-lateral stimulation system 100. As discussed above in connection with FIG. 1, the mobile device 102 is in communication with a pair (left and right) of vibrating elements 104 to provide bi-lateral stimulation either in a manual mode or an automatic mode. In the manual mode, bi-lateral stimulation may be initiated selectively (on-demand) by an individual as will be discussed below in connection with FIGS. 10-17. In an automatic (closed-loop) mode, the mobile device 102 receives and processes a plurality of environmental and physiological parameters received from the vibrating elements 104 to automatically initiate, optionally modify, monitor and cease bi-lateral stimulation as will be discussed further in connection with FIG. 9 and FIGS. 18A-C.

The mobile device 102 may comprise any conventional mobile device (e.g., cell phone, tablet or personal digital assistant) capable of loading and running application programs (commonly referred to as “apps”). Generally, mobile device 102 will include an input output device 800 which may comprise a touch-sensitive display. User commands input and information output provided from into the display/input device 800 are processed by a processor 802. The processor 802 is in communication with a memory 804 which may include one or more application programs 806 one of which comprises a bi-lateral stimulation app configured to perform the methods discussed below in connection with FIG. 17 and FIGS. 18A-C. The memory 804 may also include a memory table 808 configured to align various physiological or environmental parameters with respective thresholds for use by the mobile device 102 in the automatic mode of bi-lateral stimulation. The mobile device 102 includes a communication module 810 that may communicate with the left and right vibrating elements (via communication module 204, see FIG. 2).

Figure 8:
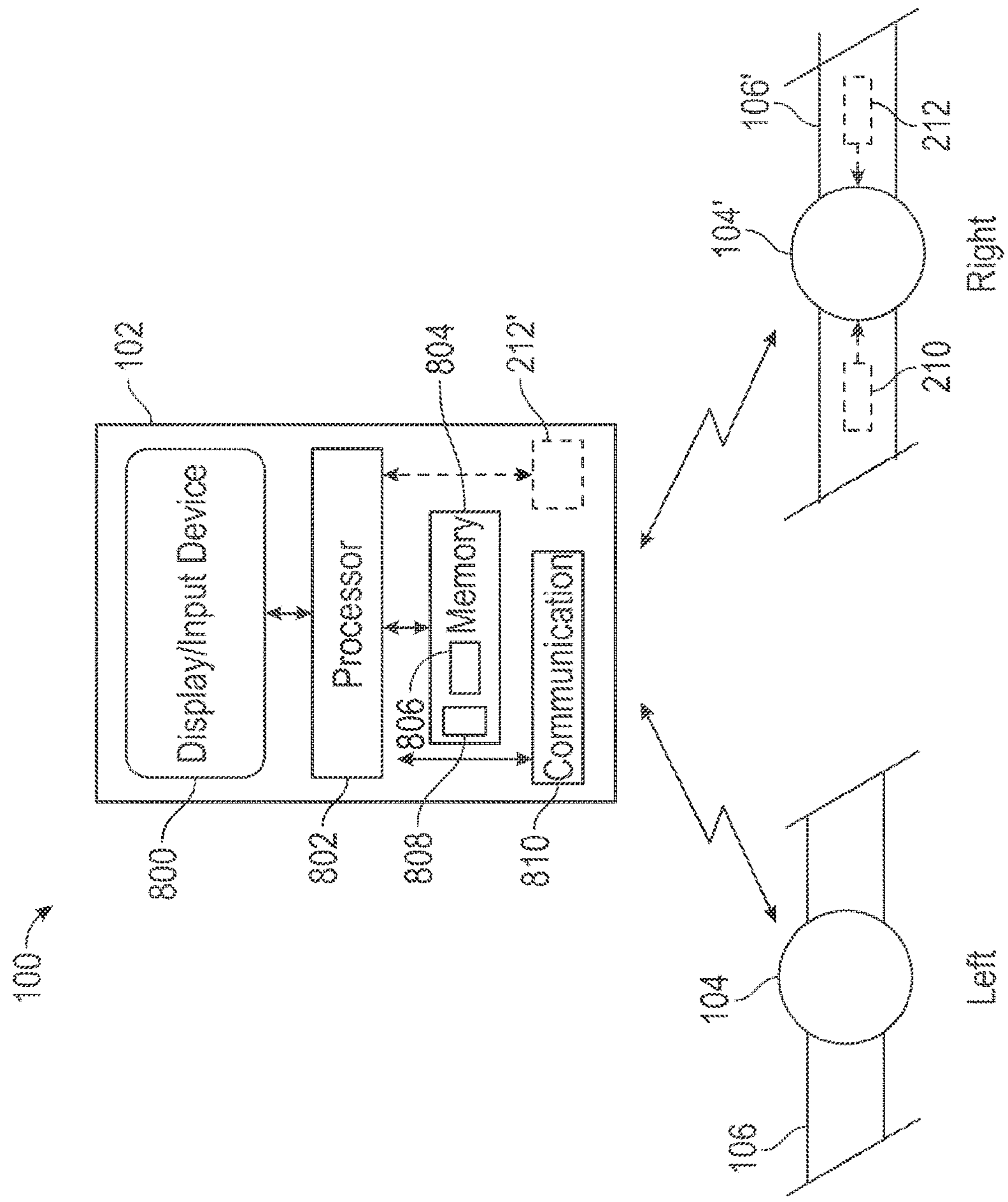
FIG. 8 is another illustration of the bi-lateral stimulation system in operation in accordance with a non-limiting embodiment.

FIG. 8 illustrates two non-limiting embodiments of the vibration elements. The left vibrating element 104 is shown coupled to a strap or band 106 that may be positioned on a wrist of an individual as discussed above. In this embodiment, the vibrating element 104 contains all of the circuitry and elements discussed above in connection with FIG. 2. The right vibrating element 104' is illustrated coupled to a band or strap 106' where the physiological sensors 210 and the environmental sensors 212 have been separated from the remaining circuitry of the vibrating element 104' and incorporated into the band or strap 106'. Additionally, in some embodiments some or all of the environmental sensors 212 may be incorporated into the mobile device 102 as illustrated in optional element 212'.

With continued reference to FIG. 8, FIG. 9 illustrates one non-limiting example of a memory (lookup) table 808 configured to align physiological and environmental parameters with thresholds and respective responsive bi-lateral stimulation therapies that may be provided to an individual in an automatic mode. In one embodiment, memory table 808 is organized to align measured parameter P1 (e.g., heart rate) 900 with threshold value T1 (for example, 100 bpm) 902 indicate to the mobile device 102 that bi-lateral stimulation should be commenced when P1 exceeds T1 and cease when P1 is equal to (or less than) a mitigation value M1 (e.g., 90 bpm) 904. The mitigation value M1 is selected (may be programmed) to indicate that the stress level of an individual has been mitigated by being reduced to a level sufficient to indicate relief from stress. The bi-lateral stimulation applied may be programmed by the individual (as will be discussed below in connection with FIG. 10-14) or optionally may have an initial therapy Th1 906 programmed into the memory table 808 which may be selected to correspond with the parameter 900 exceeding the threshold 902. Additionally, in some embodiments, a modified therapy MTh1 908 can also be programmed into memory table 808. In the event that the initial therapy does not mitigate the detected stress, the modified therapy may be initiated to attempt to achieve mitigation or at least some reduction in stress. As will be appreciated, the modified therapy may vary from parameter to parameter (P1-PN) and may be a change in intensity, duration or overlap period (see FIGS. 15A-C and FIG. 16).

In some embodiments, the mitigation value M1 904 may be selected to be equal to the threshold value T1 902. In other embodiments, the mitigation value 904 may be selected to be a certain percentage (e.g., 5%) below the threshold value 902. That is, mitigation of a detected stressful event (and thus the cessation of bi-lateral stimulation) may be achieved by reducing the measured response of a parameter P1 900 beyond the level indicated by threshold value T1 to a mitigation value M1 904 selected to assure that the individuals stress response has been mitigated. In some embodiments, the values P1-PN, T1-TN, M1-MN, Th1-ThN and MTh1-MTHN are programmed into the memory table 808 by a stress therapist or other stress response medical professional. In other embodiments, one or more of the values of table 808 may be programmed or modified by the individual.

Accordingly, to some exemplary embodiments, multiple parameters from multiple sensors are used to confirm or dispel a stressful event or situation. That is, when sensor data from one sensor indicates the appearance of stress, parameters from other sensors (physiological and environmental) are analyzed prior to initiating bi-lateral stimulation. Also, once bi-lateral stimulation is initiated (or modified) based upon detection of one or more parameters exceeding their respective thresholds, cessation of the bi-lateral stimulation may be based upon one or more other parameters meeting or exceeding their respective mitigation thresholds.

As a first non-limiting example, if heart rate (sensor 214) were to exceed its parameter threshold and skin temperature (sensor 224) were to exceed its threshold, the processor 802 may determine not to initiate bi-lateral stimulation as the individual may simply be exercising. Conversely, rising heart rate and steady or falling skin temperature, may indicate the onset on stress causing the processor 802 to begin an initial therapy from the memory table 808. Another sensor data verification example to not simulate for simple activity would be if heart rate (sensor 214) were to exceed its parameter threshold and one or both of the acceleration parameters (sensors 226, 230) indicated motion in excess of their respective thresholds, the processor 802 may determine not to initiate bi-lateral stimulation.

As another non-limiting example, if skin temperature (sensor 224) exceeded (fell below) its threshold and ambient temperature (sensor 234) was falling, the processor 802 may determine not to initiate bi-lateral stimulation as the individual may simply have entered in a cold environment.

Yet another non-limiting example would be if the blood pressure (sensor 216) parameter exceeded its threshold, but the blood oxygen (sensor 220) parameter or air quality (sensor 240) parameter did not exceed their respective thresholds (or were below their respective mitigation thresholds), then the processor 802 may determine not to initiate bi-lateral stimulation.

In some exemplary embodiments, the processor 802 may determine to initiate (or modify) bi-lateral stimulation based upon one or more parameters and then to cease bi-lateral stimulation based upon one or more other parameters. A non-limiting example of such a situation could be determining to initiate bi-lateral stimulation based upon heart rate (sensor 214) and blood pressure (sensor 216), but to cease bi-lateral stimulation based upon the blood oxygen (sensor 220) parameter exceeding its threshold. Similarly, the processor 802 may initiate bi lateral stimulation based upon heart rate (sensor 214), but to cease bi-lateral stimulation based upon one or both of the acceleration sensors (sensor 226, 230) detecting movement and the blood oxygen (sensor 220) parameter falling below its mitigation threshold.

As will be appreciated by those skilled in the stress therapy arts, various combinations of the multiple sensors and programmed thresholds may be used to detect, apply bi-lateral stimulation, modify bi-lateral stimulating and cease bi-lateral stimulation depending upon the programmed values in the memory table 808.

Figure 10:
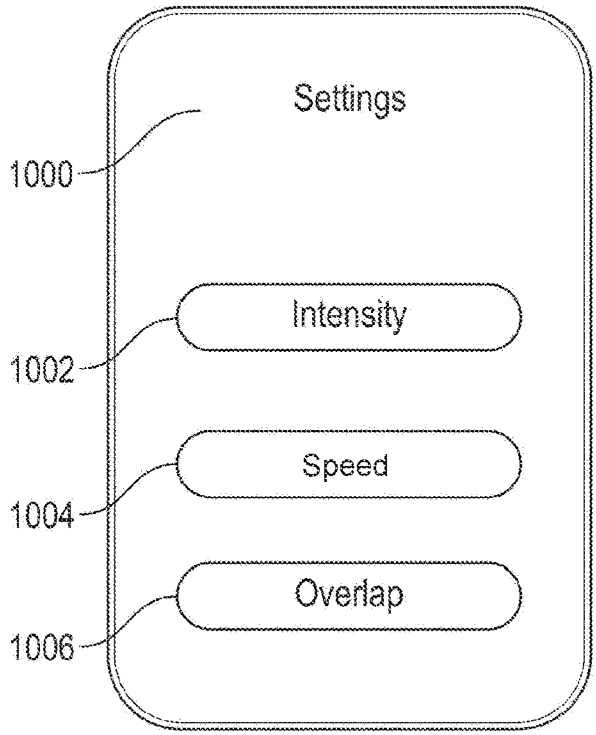
FIG. 10 is an illustration of a mobile device screenshot for programming the stimulation applied by the stimulation elements in accordance with non-limiting embodiments.

FIGS. 10-14, are non-limiting illustrations of a display screen of the mobile device 102 that may be used to program the alternating asynchronous bi-lateral stimulation of the bi lateral stimulation system 100. In FIG. 10, a settings screen 1000 is illustrated having a touch sensitive button 1002 to adjust the intensity of the vibrations, a button 1004 to adjust the duration of the vibrations and a button 1006 to adjust the overlap period during which both vibrating elements 104 are simultaneously applying stimulation to an individual's body. If no settings are provided (programmed) by the individual, the continuous bi-lateral stimulation mode is selected, with constant intensity and speed over the stimulation time periods.

Figure 11:
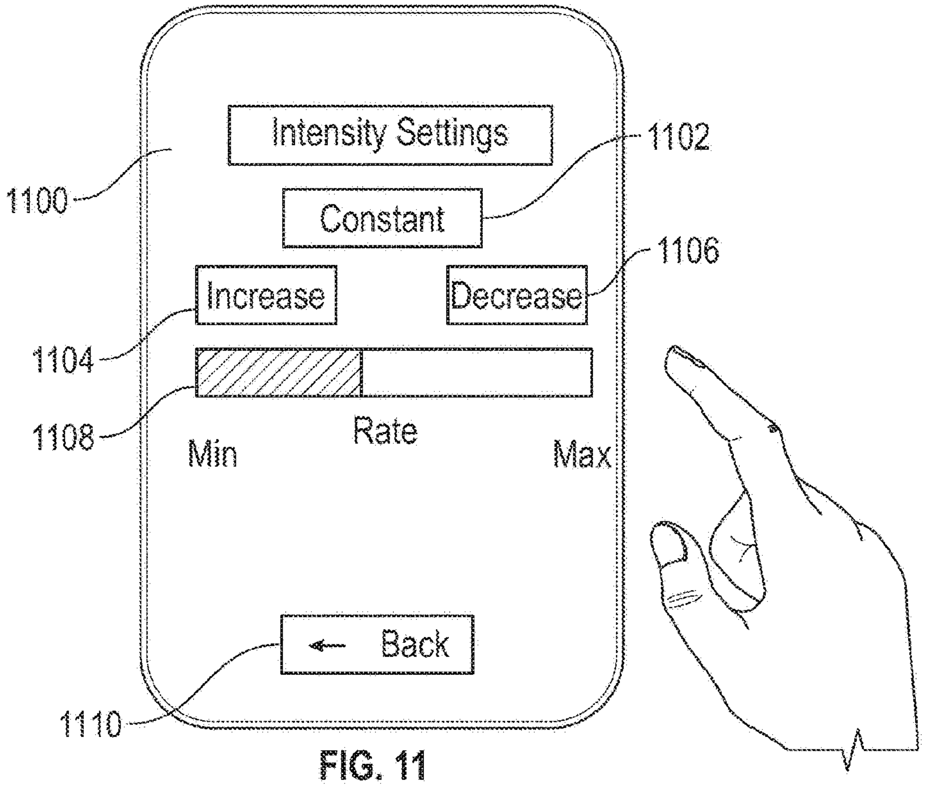
FIGS. 11-14 are illustrations of programming one parameter of the stimulation elements in accordance with a non-limiting embodiment.

FIG. 11 illustrates an example where the intensity button 1002 has been activated by the individual. According to exemplary embodiments, the intensity of stimulation during the stimulation time period may be constant, gradually increasing or gradually decreasing Accordingly, the intensity setting screen 1100 include selection buttons for selecting (programming) constant 1102, increasing 1104 or decreasing 1106 stimulation. In one non limiting embodiment, when a user selects either the increasing button 1104 or the decreasing button 1106, a slide-bar adjustment area 1108 become active so that the individual may drag an indicator from a minimum ("Min") setting to a maximum ("Max") setting as shown. Additionally, the intensity settings screen 1100 presents individual with a touch-sensitive back button 1110 to return to the setting screen 1000 of FIG. 10.

Figure 12:
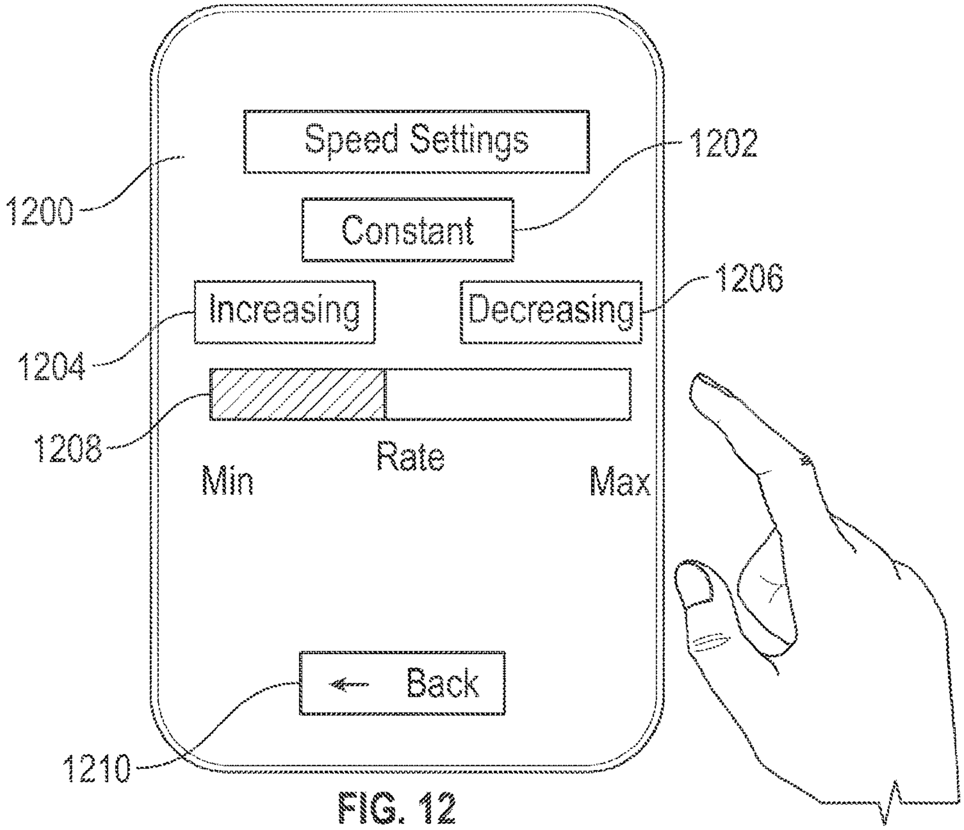

FIG. 12 illustrates an example where the speed button 1004 has been activated by the individual. According to exemplary embodiments, the speed that the stimulation is applied during the stimulation time period may be constant, gradually increasing or gradually decreasing. Accordingly, the speed setting screen 1200 include selection buttons for selecting (programming) constant 1202, increasing 1204 or decreasing 1206 stimulation speed. In one non-limiting embodiment, when a user selects either the increasing button 1204 or the decreasing button 1206, a slide-bar adjustment area 1208 become active so that the individual may drag an indicator from a minimum ("Min") setting to a maximum ("Max") setting as shown. Additionally, the speed settings screen 1200 presents individual with a touch-sensitive back button 1210 to return to the setting screen 1000 of FIG. 10.

Figure 13:
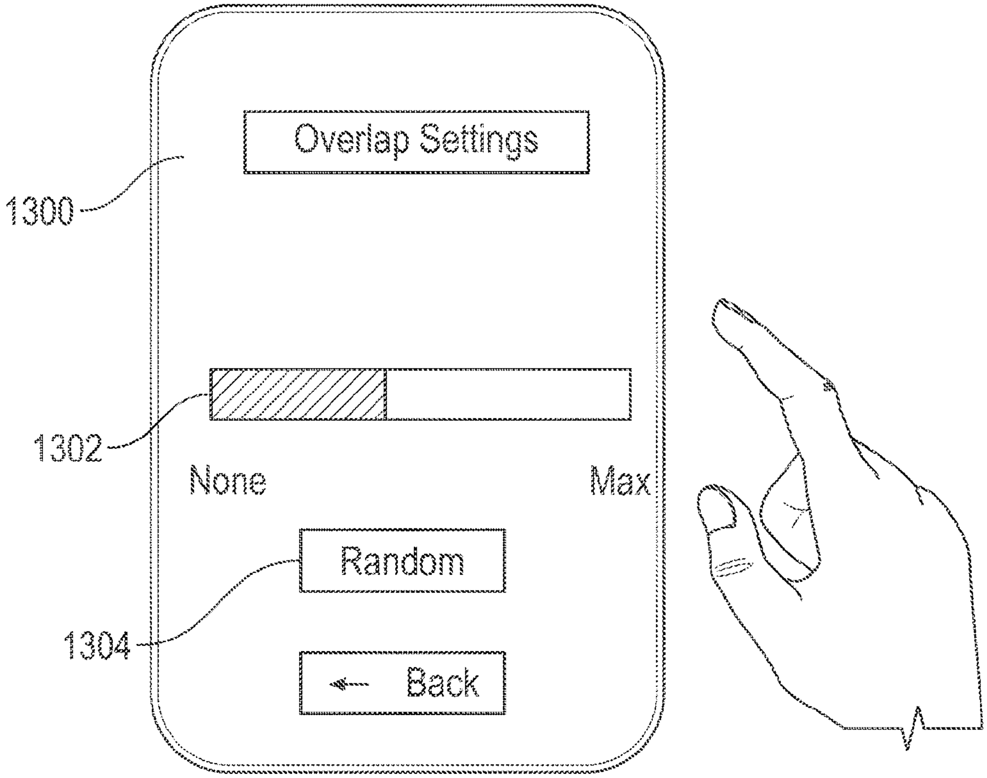
Figure 14:
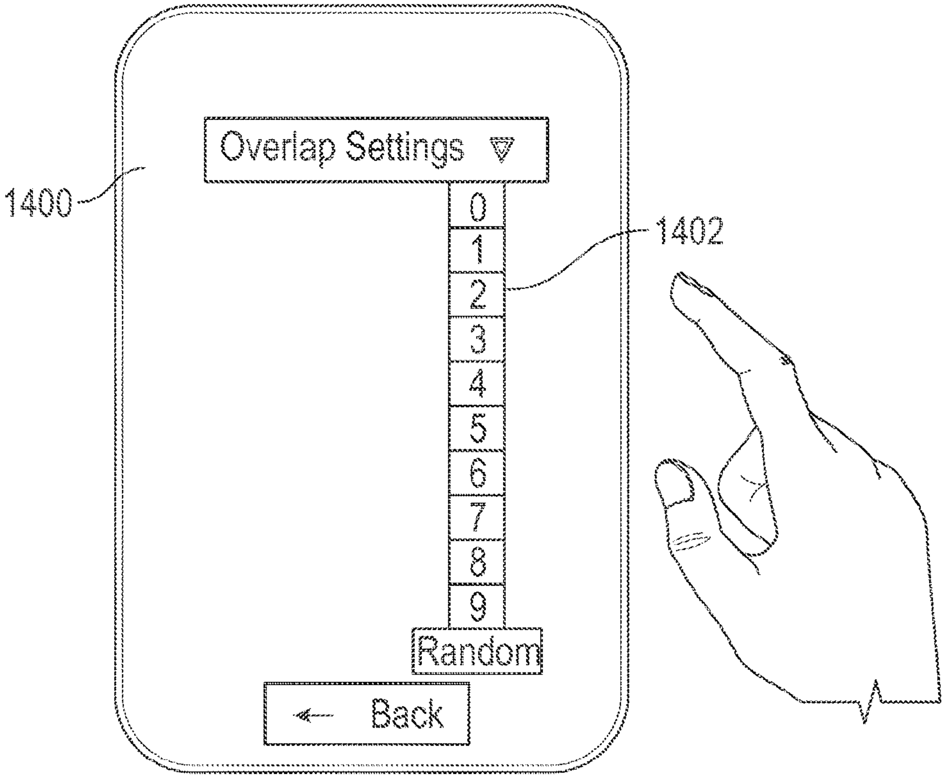

FIG. 13 illustrates an example where the overlap button 1006 has been activated by the individual. In one non-limiting embodiment, the overlap settings screen 1300 includes a slide-bar adjustment area 1302 so that the individual may drag an indicator from a "none" setting (continuous bi-lateral stimulation mode) to a "maximum" overlap setting as shown. Additionally, the overlap settings screen 1300 presents individual with a touch-sensitive randomize button 1304. When the randomize button 1304 is selected by the individual, the time period in which both vibrating elements 104 (or vibrating arrays 806) simultaneously vibrate is randomly selected by the controller (202 of FIG. 2) as will be discussed below. In FIG. 14, an alternate non-limiting embodiment of an overlap settings screen 1400 is illustrated having a drop-down menu 1402 in which the period of overlap ("0" being the continuous bi-lateral stimulation mode), or the random setting, may be selected by the individual. As will be appreciated by those skilled in the art, the screen format illustrated in FIG. 14 may also be used for adjusting the intensity setting (FIG. 11) and the speed setting (FIG. 13).

Figure 15A:
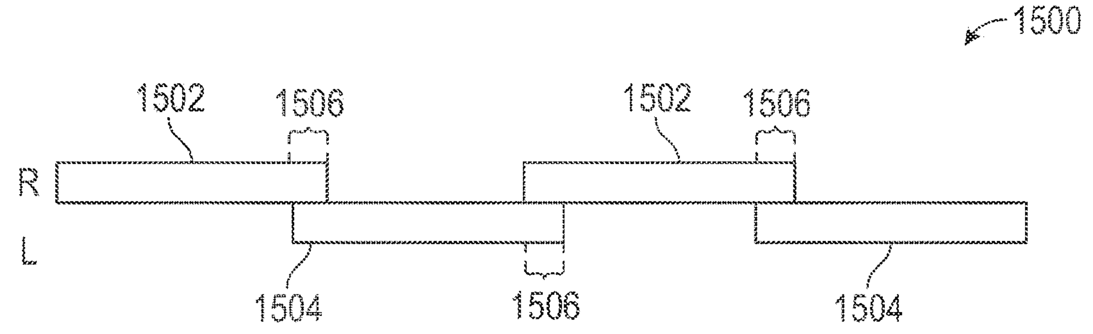
FIGS. 15A-15C are illustrations of timing diagrams for applying stimulation via the stimulation elements in accordance with non-limiting embodiments.
Figure 15B:
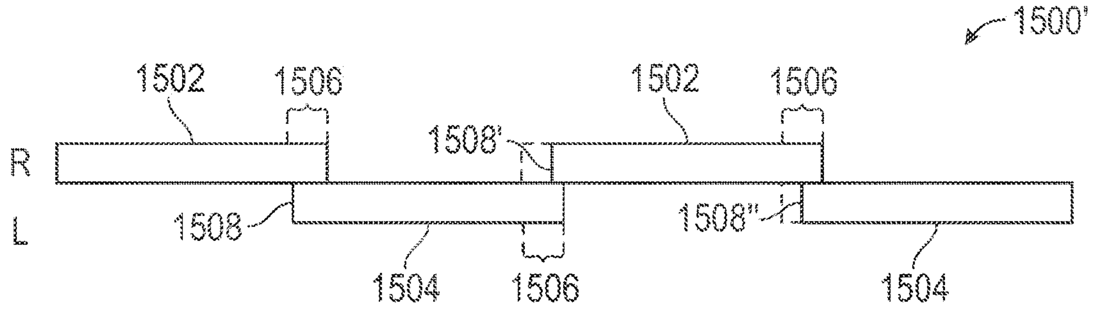

FIGS. 15A-15B are timing diagrams illustrating non-limiting embodiments of the alternating asynchronous bi-lateral stimulation as contemplated by the present disclosure. In FIG. 15A, a timing diagram 1500 illustrates a time period 1502 during which one of the vibrating elements 104 (designated "R" for a right side of an individual's body) is vibrating. Timing diagram 1500 also includes a time period 1504 during which the opposite side (designated "L" for a left side of an individual's body) vibrating element 104 is vibrating. An overlap time period 1506 is also illustrated during which both vibrating elements 104 are simultaneously vibrating. In the embodiment of FIG. 15A, the duration of the overlap period 1506 is programmed by the individual in any suitable manner, including the non-limiting examples provided in connection with FIGS. 13-14. In FIG. 15B, the randomize option has been selected by the individual (see 1304 of FIG. 13) which causes the time period in which both vibrating elements are simultaneously vibrating to be randomly selected between vibrating cycles from one side of the individual's body to the bi-lateral (opposite) side. As an example, and not as a limitation, observing from the left side to the right-side of FIG. 15B shows a leading-edge (meaning the beginning of the vibration period 1504) 1508 beginning at the maximum point (most amount of simultaneous vibration) of the overlap time period 1506. The leading-edge 1508' of time period 1502 can be seen to have a shorter time of overlapping vibrations. Moving on, leading-edge 1508" of time period 1504 can be seen to begin at about the midpoint of the overlap time period 1506. In the embodiment illustrated by timing diagram 1500' the alternating vibrations would continue to randomly overlap within the overlap time period 1506 until the individual deactivates the vibrating elements by controlling the mobile device 102 (or 802).

Figure 15C:
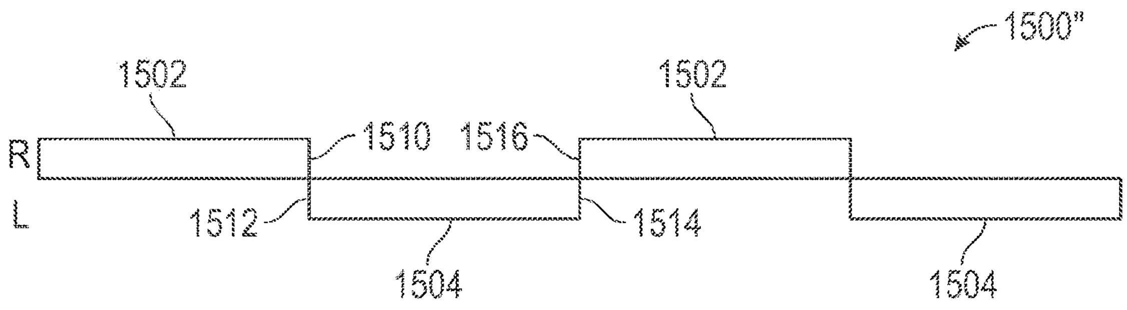

FIG. 15C is a timing diagram illustrating non-limiting embodiments of the alternating continuous bi-lateral stimulation as contemplated by the present disclosure. In FIG. 15C, a timing diagram 1500" illustrates a time period 1502 during which one of the vibrating elements 104 (designated "R" for a right side of an individual's body) is vibrating. Timing diagram 1500 also includes a time period 1504 during which the opposite side (designated "L" for a left side of an individual's body) vibrating element 104 is vibrating. As illustrated in FIG. 15C, at the conclusion (trailing edge 1510) of the vibrating time period 1502, the vibrating period 1504 begins (leading edge 1512) without pause or interruption in the stimulation being applied to the individual. As such, this form of stimulation is said to be continuous bi-lateral stimulation. Similarly, at the conclusion (trailing edge 1514) of the vibrating time period 1504, the vibrating period 1502 begins again (leading edge 1516) also without pause or interruption in the stimulation being applied to the individual.

Figure 16:
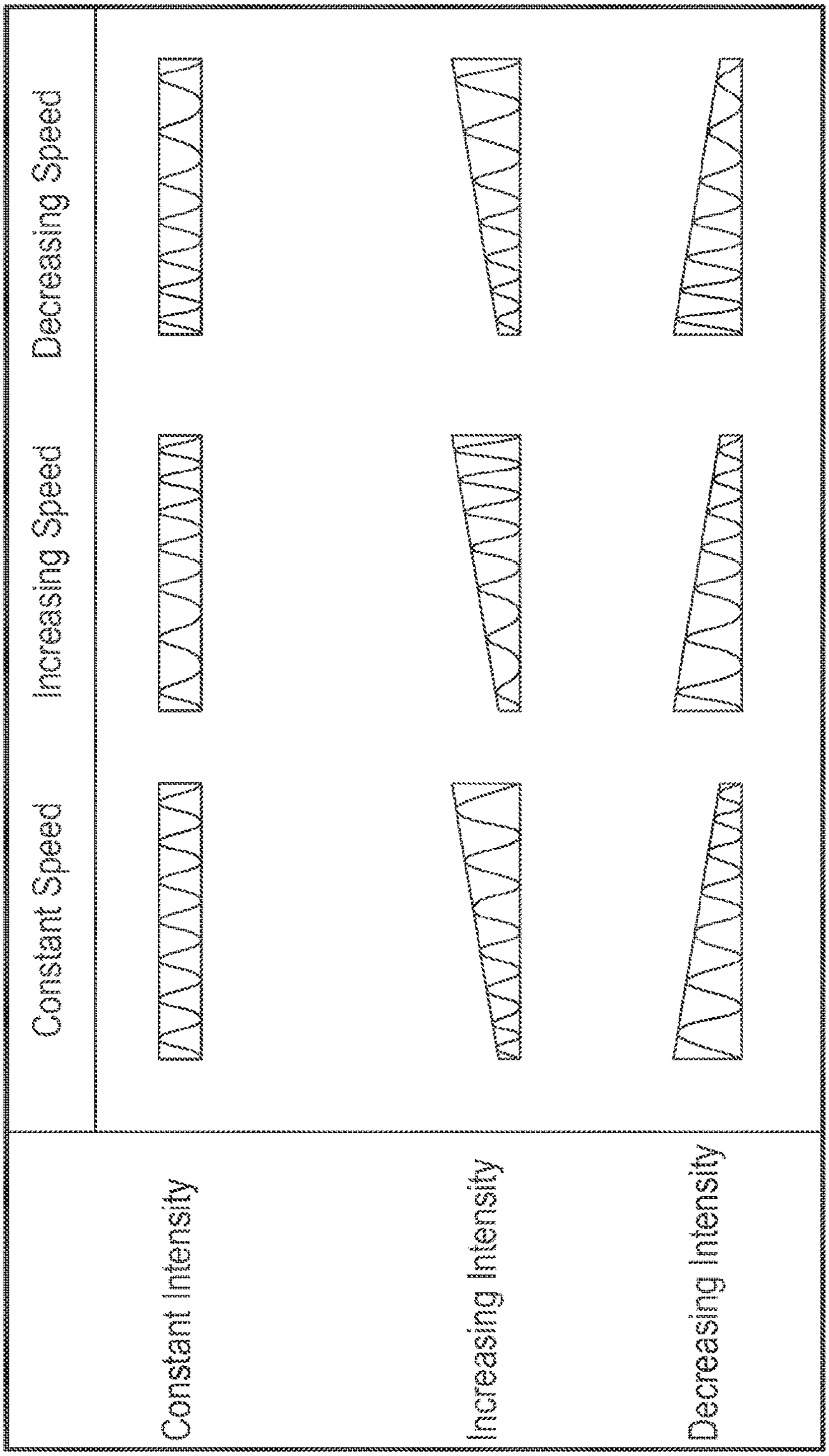
FIG. 16 are illustrations of various permutations of operating modes of the present disclosure in accordance with non-limiting embodiments.

FIG. 16 illustrates some of the possible operating modes of the system of the present disclosure to provide the therapeutic benefit afforded by the method disclosed herein. As discussed above in connection with FIGS. 15A-15C, one mode of operation focuses on whether the system is providing alternating asynchronous bi-lateral stimulation (fixed or random overlap) or alternating continuous bi-lateral stimulation (no gap or pause between left and right stimulations). Additionally, as shown in FIG. 16, the intensity and the speed of stimulation may be constant, gradually increasing or gradually decreasing over the stimulation period leading to the nine operating modes illustrated in FIG. 16. A person can vary the settings (see, FIGS. 10-14 and associated text) to find the mode of operation that provides the greatest benefit to that person under the present circumstances.

Figure 17:
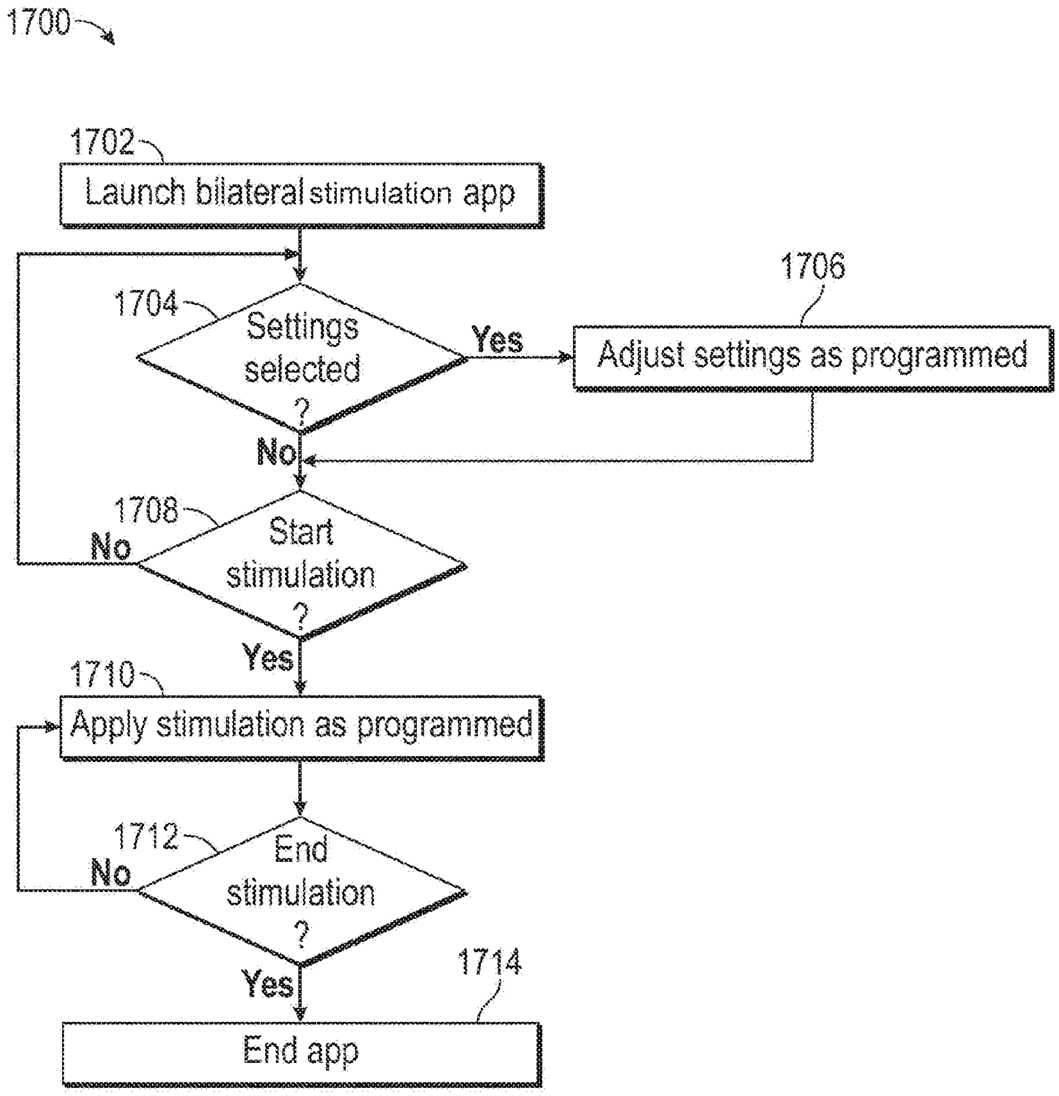
FIG. 17 is a flowchart of a manual bi-lateral stimulation method in accordance with a non-limiting embodiment.

FIG. 17 is a flow diagram of a method 1700 performed by the bi-lateral stimulation system for manual application of bi-lateral stimulation in accordance with a non-limiting embodiment. In one embodiment, the various tasks performed in connection with the method 1700 of FIG. 17 are performed by instruction stored on a non-transitory computer medium (e.g., application program 806 of FIG. 8) being executed in a processing unit (e.g., processor 802 of FIG. 8), hardware, firmware, or any combination thereof.

For illustrative purposes, the following description of the method 1700 of FIG. 17 refers to elements mentioned above in connection with FIG. 1 to FIG. 16.

It should be appreciated that the method of FIG. 17 may include additional or alternative tasks, or may include any number of additional or alternative tasks, and that the method of FIG. 17 may be incorporated into a more comprehensive procedure or process having additional functionality not described in detail herein or implemented as a stand-alone procedure. Moreover, one or more of the tasks shown in FIG. 17 are removable from an embodiment of the method 1700 of FIG. 17 as long as the intended overall functionality remains intact.

The method begins in block 1702 where the bi-lateral stimulation application (app) is launched (begun) on the mobile device 102 so that the individual may receive the asynchronous (or continuous) alternating bi-lateral stimulation as discussed above. In block 1704, a determination is made as to whether the individual has selected a settings feature to adjust the programming of the stimulation as discussed above in connection with FIGS. 10-14. If the determination of block 1704 is that the individual has elected to adjust the programming of the stimulation, the method proceeds to block 1706 where the settings are adjusted as desired by the individual as discussed above. Conversely, if the determination of block 1704 is that the individual has not elected to change the stimulation programming, the routine proceeds to block 1708 to determine whether the individual has activated the stimulation. If not, the routine loops around to block 1704 and routine continues. Assuming the determination of block 1708 is that the individual desires to commence stimulation, the stimulation is applied in asynchronous (or continuous) and alternate manner in block 1710 as discussed above. The stimulation can continue for a time period of until the individual decides to stop the stimulation as determined in block 1712, at which point the application ends in block 1714. Otherwise, the routine loops back to step 1710 and the stimulation is continued for a predetermined time period or for any time period desired by the individual.

Figure 18A:
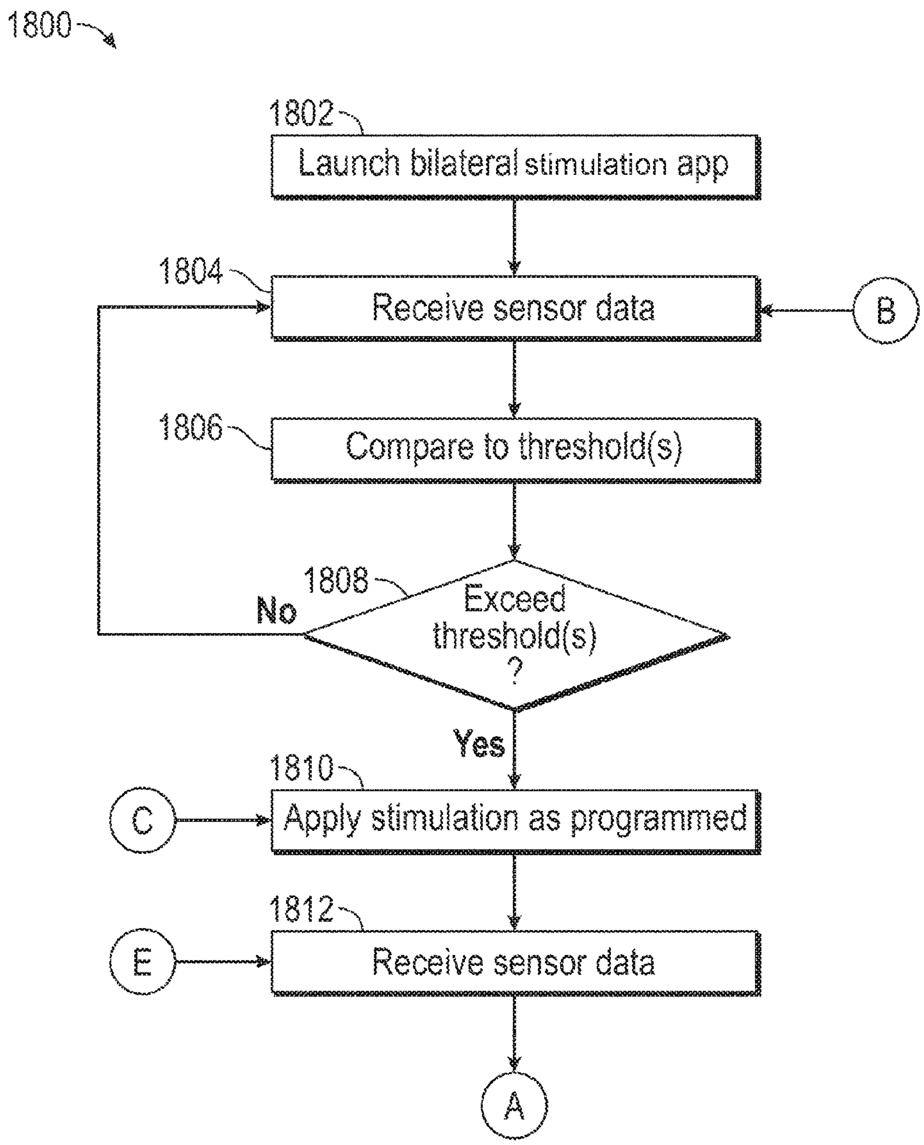
FIGS. 18A-18C is a flow chart of an automatic (closed-loop) bi-lateral stimulation method in accordance with non-limiting embodiments.
Figure 18B:
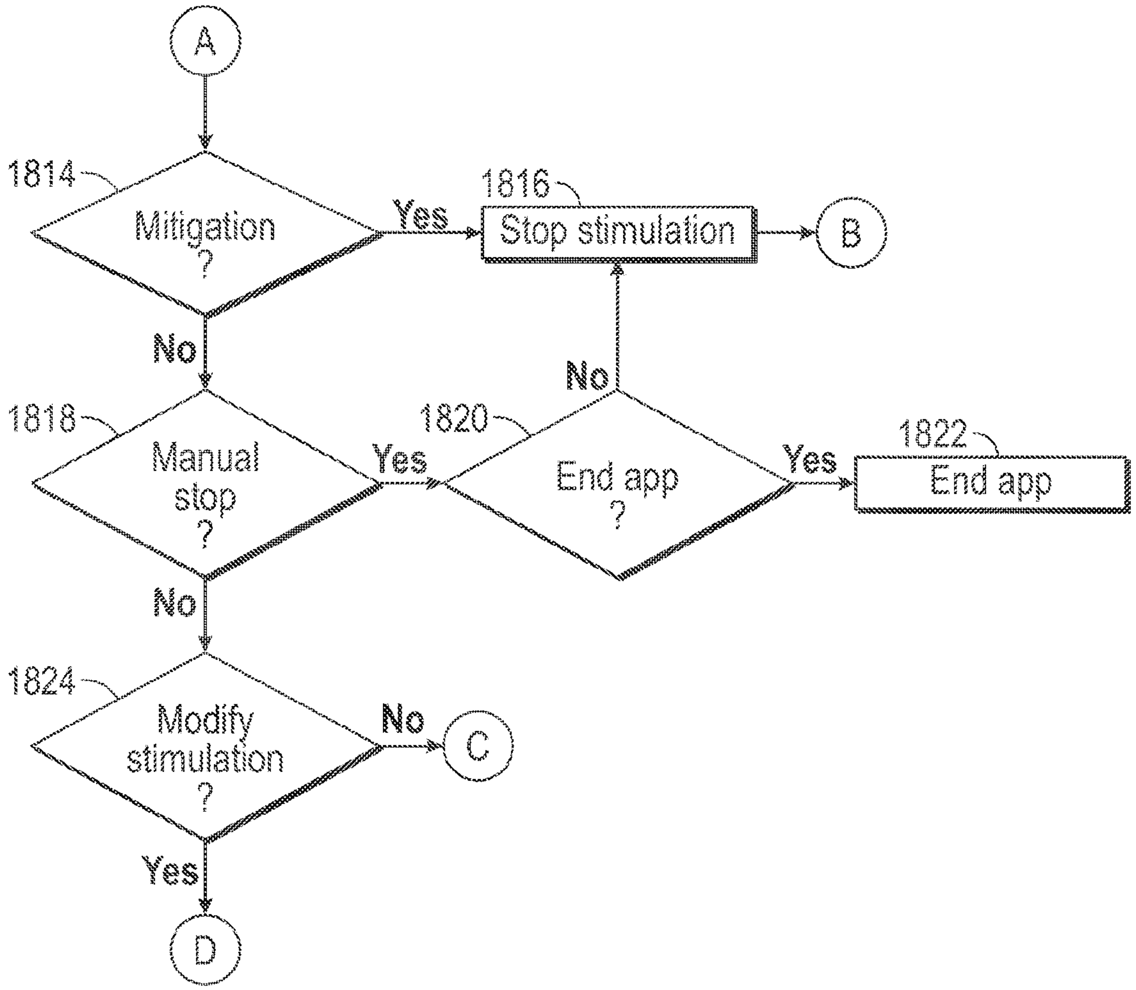
Figure 18C:
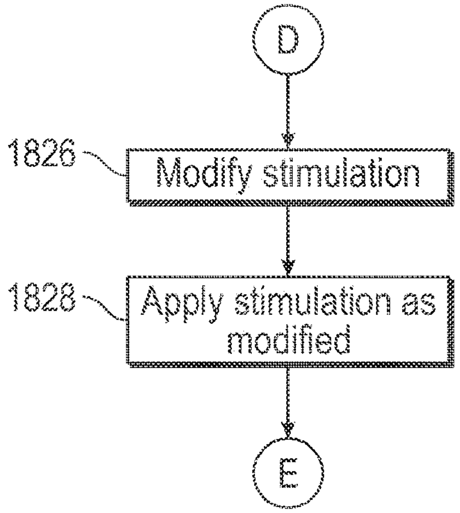

FIGS. 18A-18C are flow diagrams of a method 1800 performed by the bi-lateral stimulation system for automatic (closed-loop) application of bi-lateral stimulation in accordance with a non-limiting embodiment. In one embodiment, the various tasks performed in connection with the method 1800 of FIGS. 18A-C are performed by instruction stored on a non-transitory computer medium (e.g., application program 806 of FIG. 8) being executed in a processing unit (e.g., processor 802 of FIG. 8), hardware, firmware, or any combination thereof.

For illustrative purposes, the following description of the method 1800 of FIG. 18A C refers to elements mentioned above in connection with FIG. 1 to FIG. 16.

It should be appreciated that the method 1800 of FIGS. 18A-C may include additional or alternative tasks, or may include any number of additional or alternative tasks, and that the method of FIGS. 18A-C may be incorporated into a more comprehensive procedure or process having additional functionality not described in detail herein or implemented as a stand-alone procedure. Moreover, one or more of the tasks shown in FIGS. 18A-C are removable from an embodiment of the method 1800 of FIGS. 18A-C as long as the intended overall functionality remains intact.

The method begins in block 1802 where the bi-lateral stimulation application (app) is launched (begun) on the mobile device 102 so that the individual may receive the asynchronous (or continuous) alternating bi-lateral stimulation in an automatic (closed-loop) mode as discussed above. In block 1804, the mobile device (e.g., processor 802) receives the sensor data from the physiological sensors 210 and the environmental sensors 212. In block 1806, the receive sensor data is compared to thresholds stored in the memory table (e.g., 808 of FIG. 8) in block 1808 determines whether any of the received sensor parameter data exceeds the threshold. If not, the routine loops back to block 1804 to await the reception of the next package of sensor data which may occur periodically (e.g., every minute, 5 minutes, 10 minutes) or as desired in any particular implementation. If one or more of the thresholds has been exceeded, block 1810 applies alternating bi-lateral stimulation as programmed. In some embodiments, the programming represents the bi-lateral stimulation as programmed by the individual for the manual mode (see FIGS. 10-14). In other embodiments, the programming represents a bi-lateral stimulation programming associated with the sensor parameter parameter(s) that have exceeded their threshold (e.g., Th1 of FIG. 9). After the stimulation has been applied by block 1810 (for example after a time period or as a stimulation therapy session is about to conclude) the mobile device 102 receives refreshed/updated sensor data in block 1812. Block 1814 determines if mitigation of the stress has been achieved. In some embodiments, the mitigation of stress is determined by the sensor parameter falling below the threshold that triggered the application of the bi-lateral stimulation (e.g., T1 of FIG. 9), while in other embodiments, the mitigation of stress is determined by the sensor parameter equaling or falling below the mitigation threshold (e.g., M1 of FIG. 9) as discussed above. If mitigation has been achieved, then the stimulation is stopped in block 1816 and the routine returns to block 1804 to receive the next cycle of updated sensor information. Conversely, if the determination of block 1814 is that mitigation has not been achieved, block 1818 determines whether a manual stop command has been entered by the user. If so, then it is possible that the bi-lateral stimulation app has incorrectly determined the onset of a stressful condition. For example, if an individual had engaged in an outdoor activity, but was not under stress, it is possible that the bi-lateral stimulation app (806 in FIG. 8) may have incorrectly determined that a stressful condition had occurred (or was about to occur) for the individual. If block 1818 determines that a manual stop command was received, block 1820 determines whether the individual has instructed the bi-lateral stimulation app to end so that the individual may continue with the activity that s/he is engaged in without further automatically triggering further bi-lateral stimulation. If so, the app ends in block 1822, otherwise the stimulation is simply stopped in block 1816 the routine returns back to block 1804 for the next cycle of updated sensor data.

If a manual stop command was not received, block 1824 determines whether to modify the bi-lateral stimulation being applied. As will be appreciated, at this point in the routine, bi-lateral stimulation has been provided (block 1810) but mitigation has not occurred (block 1814). Therefore, block 1824 determines whether to modify the stimulation being applied. Non-limiting examples of modification include increasing intensity, increasing duration, changing the stimulation overlap period, changing from continuous to asynchronous bi lateral stimulation or any other modifications desired in any particular implementation. If the determination of block 1824 is that no modification is needed, the routine loops back to block 1810 where the currently programmed bi-lateral stimulation continues to be applied. Conversely, if the determination of block 1824 is to modify the bi-lateral stimulation, that modification is applied in block 1826 in the stimulation is applied in block 1828 before returning to block 1812 to receive the next cycle of updated sensor data following the application of the modified bi-lateral stimulation.

The present disclosure has been described in terms of improving an individual's performance by reduction in stress that can assist a person in real or imagined situations in everyday live, relieve stress or anxiety prior to surgery or a medical procedure (for themselves or a family member), relieve post-surgical and physical therapy stress during recovery.

The disclosed methods and systems provide asynchronous (or continuous) alternating bi-lateral stimulation to support the reduction of stress in persons. In various non-limiting embodiments, the bi-lateral stimulation can be selectively (manually) activated by an individual perceiving a need for reduction in stress or automatically (closed-loop) via the bi-lateral stimulation system monitoring and evaluating one or more physiological and environmental parameters. It will be appreciated that the disclosed asynchronous methods and systems provide an advantage with the overlapping time period of simultaneous stimulation which enhances the bi-lateral impact in the somatosensory areas of the person's brain. It will also be appreciated that the disclosed continuous methods and systems provide an advantage by not allowing time for the person's brain to activate the somatosensory areas of the individual's brain. The disclosed asynchronous and continuous bi-lateral stimulations regimes provide an advantage over conventional bi-lateral stimulators in ensuring that the stimulation gap commonly used in conventional bi-lateral stimulators will not allow the brain to activate the sympathetic system.

It will be appreciated that the various illustrative logical blocks/tasks/steps, modules, circuits, and method steps described in connection with the embodiments disclosed herein may be implemented as electronic hardware, computer software, or combinations of both. Some of the embodiments and implementations are described above in terms of functional and/or logical block components or modules and various processing steps. However, it should be appreciated that such block components or modules may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope as set forth in the claims.

For example, an embodiment of a system or a component may employ various integrated circuit components, for example, memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word exemplary is used exclusively herein to mean serving as an example, instance, or illustration. Any embodiment described herein as "exemplary" is not necessarily to be construed as preferred or advantageous over other embodiments.

The steps of a method described in connection with the embodiments disclosed herein may be embodied directly in hardware, in a software module executed by a processor, or in a combination of the two, A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as first, second, third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as connect or coupled to that are used in describing a relationship between different elements does not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments.

What is claimed is:

1. A method for providing a therapeutic benefit to an individual experiencing a stressful event or situation, comprising:

(a) applying at least a first handholdable stimulation device and a second handholdable stimulation device to one or more body parts of the individual comprising the individual's hands, wrists, arms, chest, legs, or ankles;

(b) receiving sensor data from two or more physiological sensors associated with the individual, wherein the two or more physiological sensors are components of one or more devices that receive two or more types of physiological data from the individual;

(c) determining whether the sensor data from one or more of the two or more physiological sensors indicates the appearance of the stressful event or situation;

(d) analyzing the sensor data from at least one other of the two or more physiological sensors to confirm the appearance of the stressful event or situation;

(e) once the stressful event or situation is confirmed, activating a first tactile stimulator in the first handholdable stimulation device to provide a first tactile stimulation for a first period during which the physiological sensor data indicates the appearance of the stressful event or situation; and (f) activating a second tactile stimulator in the second handholdable stimulation device to apply a second tactile stimulation for a second period beginning either prior to or simultaneously with the cessation of the first time period such that the operation of the first and second tactile stimulators provides only for application of uninterrupted stimulation to the individual when the first tactile stimulator and second tactile stimulator are each still in operation, whereby, the first and second tactile stimulations are applied bilaterally to the one or more body parts of the individual wherein the first and second tactile stimulators are only activated after step (d) once the at least one other sensor of the two or more physiological sensors is analyzed and confirms the stressful event or situation, and wherein tactile stimulation is the only stimulation applied to the individual caused by the operation of the first and second stimulators; and (g) repeating steps (b)-(f) until the sensor data falls below a mitigation threshold.

2. The method of claim 1, wherein the two or more physiological sensors comprise a separate component from the first and the second tactile stimulators.

3. The method of claim 1, wherein the first and second tactile stimulators are configured to receive wireless communications comprising stimulation setting information.

4. The method of claim 3, wherein the first and second tactile stimulators are configured to receive wireless communications from a wireless controller.

5. The method of claim 4, wherein the first and second tactile stimulators provide only for continuous or asynchronous bilateral stimulation.

6. The method of claim 1, wherein the first and second tactile stimulators provide only for continuous or asynchronous bilateral stimulation.

7. The method of claim 6, further comprising, after step (a), allowing the individual to control the at least first handholdable stimulation device and second handholdable stimulation device without the assistance of any additional caregiver; and wherein the individual can choose one or more overlap selection states setting the amount of time that the first device and second device are providing bilateral stimulation and wherein each overlap selection defines a degree of asynchronous stimulation the individual receives from the first tactile stimulator and second tactile stimulator.

8. The method of claim 7, wherein the single device associated with the user is a mobile controller that also can control one or more characteristics of the tactile stimulation applied by the first tactile stimulator and the second tactile stimulator.

9. The method of claim 1, wherein two or more of the two or more physiological sensors are contained in a single device associated with the individual.

10. The method of claim 9, wherein the single device associated with the individual is a mobile controller that also can control one or more characteristics of the tactile stimulation applied by the first tactile stimulator and the second tactile stimulator.

11. The method of claim 9, wherein the first and second tactile stimulators provide only for continuous or asynchronous bilateral stimulation.

12. The method of claim 9, wherein the individual can choose one or more overlap selection states setting the amount of time that the first device and second device are providing bilateral stimulation and wherein each overlap selection defines a degree of asynchronous stimulation the individual receives from the first tactile stimulator and second tactile stimulator.

* * * * *